Figure 4:
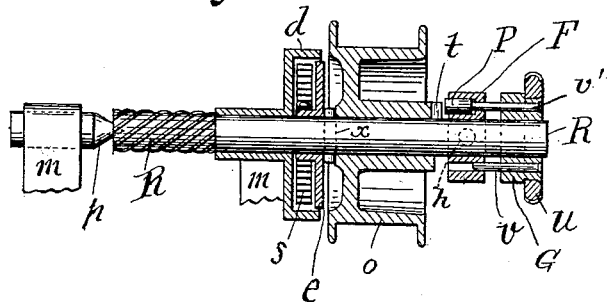

(No Model.) 2 Sheets—Sheet 1.
W. HOUGHTALING.
ATTACHMENT FOR STEAM ENGINE INDICATORS.
No. 494,482. Patented Mar. 28, 1893.
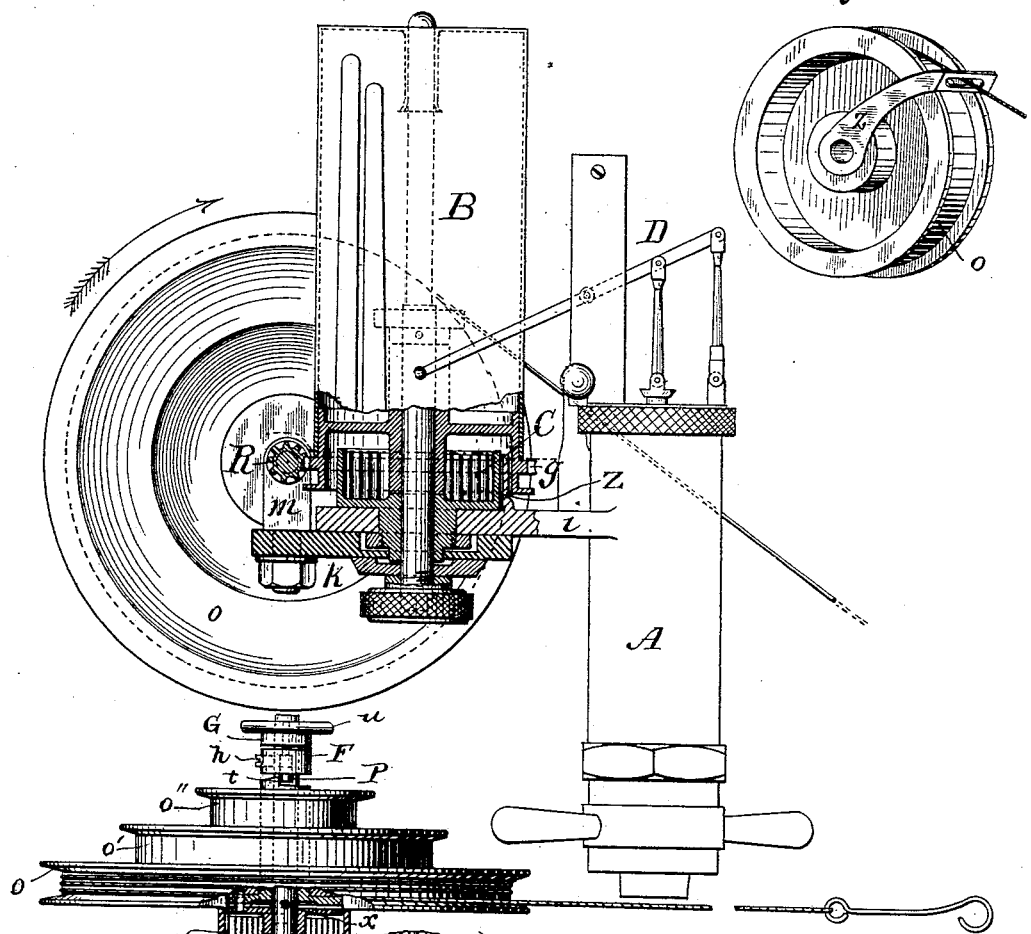
Witnesses
Chas Hanimann
[signature]
Inventor
William Houghtaling
By [signature] Attorney (No Model.) 2 Sheets—Sheet 2.

W. HOUGHTALING.
ATTACHMENT FOR STEAM ENGINE INDICATORS.

No. 494,482. Patented Mar. 28, 1893.

UNITED STATES PATENT OFFICE.

WILLIAM HOUGHTALING, OF BRIDGEPORT, CONNECTICUT, ASSIGNOR TO THE ASHCROFT MANUFACTURING COMPANY, OF SAME PLACE.

ATTACHMENT FOR STEAM-ENGINE INDICATORS.

SPECIFICATION forming part of Letters Patent No. 494,482, dated March 28, 1893.

Application filed December 10, 1891. Serial No. 414,548. (No model.)

*To all whom it may concern:*

Be it known that I, WILLIAM HOUGHTALING, a citizen of the United States, residing at Bridgeport, in the county of Fairfield and State of Connecticut, have invented a new and useful Improvement in Attachments for Steam-Engine Indicators, of which the following is a specification, reference being had to the following drawings, in which—

Figure 1, represents an elevation partly in section, of an indicator embodying the invention; Fig. 2, a plan view; Fig. 3, a perspective view of a cord pulley and guide detached, and Figs. 4 and 5 enlarged views showing details of the cord pulley and connections.

The object of my invention is to adapt an indicator for use upon engines having different lengths of stroke of piston and different speeds, and in order that others may understand and practice my invention, I will proceed to describe the same and subsequently to point out in the claims its novel characteristics.

In the drawings, A, is the piston cylinder of the indicator, B, the diagram barrel, C, its retracting spring, and D, the pencil mechanism.

In applying my invention, no change is made in these parts except in arranging a circumferential gear at the base of the diagram barrel (shown at $g$, Figs. 1 and 2) to mesh with the worm shaft R, of the pulley $o$. This gearing may be formed as shown upon the periphery of the projecting collar of the diagram barrel that forms the guide to the operating cord on the instrument, as ordinarily used.

The attachment is composed of a supporting base piece $k$, provided with short standards $m$, that form bearings for the worm shaft R to which the pulley $o$ is connected, the outer bearing being a pivot $p$, which receives the entire thrust of the shaft R which relieves the collar $r$ from contact with the standard, thus reducing the friction to the minimum. This effect is produced by the action of the recoil spring of the diagram barrel crowding its gear against the worm shaft constantly toward the pivot bearing. I have found in practice that the pitch of the thread of the worm shaft should be formed at an angle of about forty-five degrees to insure the most delicate bearing with its connecting gearing. The attachment is secured directly to the indicator upon the projecting arm $i$, that supports the diagram barrel, and the worm shaft R of the pulley $o$ meshes directly with the gear upon said diagram barrel, whereby the attachment is adjacent to the indicator and is handled with great facility, and may be readily detached or replaced without disarranging the other parts.

The cord pulley is composed of a series of pulleys of different diameters fastened together as shown at $o, o'\ o''$, in Fig. 2, and each should correspond to a given length of stroke of piston of the engine to which the indicator is attached. For example, with a certain length of stroke of the engine piston, the pulley should be of a diameter to transmit the desired motion to produce the extreme oscillation of the diagram barrel, and for engines with shorter stroke of piston a smaller diameter of the pulley is used to maintain the same oscillation of the diagram barrel, the respective dimensions of these parts being a matter of predetermined calculation in their manufacture.

The action of the diagram barrel spring C, will be found in practice to be sufficient to return the barrel to its normal position, and to take up any slack in the operating cord incidental to high speed, but as an auxiliary, if the latter effect is produced, especially with the larger diameter of pulley, an additional coil spring may be applied to the pulley shaft as shown at $s$, to assist in preventing such slack; also to maintain the cord in proper winding position within the groove of the pulley, a slotted guide $z$ may be connected thereto, as shown in Fig. 3. It is believed, however, that these expedients will not be necessary to the perfect operation of the mechanism.

Figure 5:
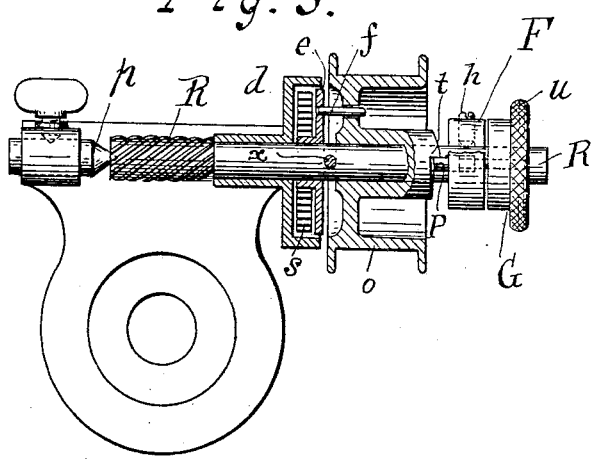

The enlarged views, Figs. 4 and 5 show in detail the connection of a single cord pulley $o$, with the clutch and shaft R, and auxiliary spring $s$. The clutch is composed of a fixed collar F, secured to the shaft R by a set screw $h$, and loose collar G, the latter adapted to slide longitudinally on the shaft, and to engage with the fixed portion by means of the pins $v$, $v'$, and clutch bolt P, formed as an extension of the pin $v'$. This cord pulley is fitted loosely upon the shaft R, abutting the pin $x$ and connected to its retracting spring $s$, by means of the pin $f$, and is constructed with its hub projecting and notched at $t$, to form a clutch engagement with the bolt P, of the fixed collar F. This projecting notched hub or clutch of the pulley is also constructed with a cam face as shown in Figs. 4 and 5. The object of this construction is to automatically disengage the clutch bolt P, by the reverse motion of the pulley when the operator has failed to engage the clutch at the proper time which is at the commencement of the stroke. The effect of this operation is to prevent further movement of the diagram barrel which returns to its normal position against its stop Z by the action of its recoil spring, and which prevents any markings upon the diagram. Therefore it will be seen, that this automatic disengagement not only prevents a marking of the diagram, but also gives the operator a chance to make the clutch engagement at the proper time.

In making the clutch engagement, it is found desirable in practice to turn the diagram barrel by hand slightly forward and clear of its recoil stop Z, so that when the clutch engagement is made, the slight extra tension given to the cord will prevent the barrel from slamming against its stop Z in its recoil movement.

The collar G is provided with a loose ring $u$, whereby said collar can be moved in or out of engagement while the shaft is rotating without removing the hand.

The pulley is provided with an intersecting pin $f$ that engages with the auxiliary retracting spring $s$.

Of course it will be obvious that if the auxiliary retracting spring is dispensed with, the pin $f$ would also be dispensed with and the cord pulley would be fixed to rotate with the shaft directly. With my invention, therefore, it will be seen that in locating the cord pulley adjacent to the indicator and gearing its shaft directly with the diagram barrel to transmit a positive motion, not only insures greater certainty of operation, but greater facility of manipulation.

In the use of a series of pulleys secured together as at $o$, $o'$, $o''$ shown in Fig. 2, all that is necessary to do is to change the operating cord from one to the other to adapt the device to engines having a greater or less stroke of engine piston.

Having thus fully described my invention, what I claim, and desire to secure by Letters Patent, is—

1. In a steam engine indicator, the combination with the diagram barrel of a cord pulley composed of a series of pulleys of different diameter secured together to adapt the indicator to engines having a different length of stroke, a connected worm spindle geared with the diagram barrel to rotate the same in one direction, and a retracting spring to return the barrel to its normal position, as set forth.

2. The combination in a steam engine indicator of the diagram barrel, a pulley for communicating motion to said barrel, a cord for operating the same connected with a reciprocating part of the engine, and an engaging clutch adapted to automatic disengagement, substantially as described.

3. The combination with the diagram barrel and its retracting spring, of the pulley $o$, auxiliary spring $s$, and connected cord, substantially as and for the purpose set forth.

4. The combination with the cord pulley, of the sliding collar G, engaging bolt P, and the clutch $t$, constructed with a cam surface as shown, whereby the bolt is automatically disengaged, substantially in the manner and for the purpose specified.

5. The combination of the cord pulley $o$, provided with the clutch $t$, the collar F, sliding collar G, engaging bolt P, and ring $u$, substantially as described.

WILLIAM HOUGHTALING.

Witnesses:
HOWARD H. KNAPP,
M. LUSCOMB.